(12) United States Patent
Saarisalo et al.

(10) Patent No.: US 9,098,787 B2
(45) Date of Patent: Aug. 4, 2015

(54) DEVICE, MODULE AND METHOD FOR SHARED ANTENNA OPERATION IN A RFID TECHNOLOGY BASED COMMUNICATION ENVIRONMENT

(75) Inventors: Mikko Saarisalo, Kantvik (FI); Janne Jalkanen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1254 days.

(21) Appl. No.: 11/922,653

(22) PCT Filed: Jun. 30, 2005

(86) PCT No.: PCT/IB2005/001869
§ 371 (c)(1),
(2), (4) Date: Dec. 20, 2007

(87) PCT Pub. No.: WO2007/003978
PCT Pub. Date: Jan. 11, 2007

(65) Prior Publication Data
US 2009/0093272 A1 Apr. 9, 2009

(51) Int. Cl.
*H04B 1/38* (2006.01)
*G06K 19/07* (2006.01)
(Continued)

(52) U.S. Cl.
CPC ........ *G06K 19/0723* (2013.01); *G06K 7/10237* (2013.01); *G06K 19/072* (2013.01);
(Continued)

(58) Field of Classification Search
CPC ............ G06K 7/10237; G06K 19/072; G06K 19/0723; G06K 19/0724; G06K 19/07786; G06K 19/07345; H04B 5/00; H04B 5/0068; H04B 5/0062
USPC ........ 340/10.1, 3.1, 825.19, 825.52; 455/557, 455/558, 411, 78, 82, 553.1, 95; 343/876, 343/893, 787, 832, 833, 834
See application file for complete search history.

(56) References Cited

U.S. PATENT DOCUMENTS

| 5,988,510 A | * | 11/1999 | Tuttle et al. | ........... | 235/492 |
| 2002/0042637 A1 | * | 4/2002 | Stover | ........... | 607/60 |

(Continued)

FOREIGN PATENT DOCUMENTS

| CN | 1112760 A | 11/1995 |
| CN | 25132964 Y | 9/2002 |

(Continued)

OTHER PUBLICATIONS

The Office Action with English translation of parallel Korean application No. 2007-7030610 dated Jan. 20, 2010.
(Continued)

*Primary Examiner* — Jennifer Mehmood
*Assistant Examiner* — Yong Hang Jiang
(74) *Attorney, Agent, or Firm* — Locke Lord LLP (57) ABSTRACT

In general, the present invention relates to a systems, apparatuses and methods. The system comprises in principle a mobile terminal device and at least one smart memory module. The smart memory module comprises a RFID technology based communications circuitry. The mobile terminal device comprises an antenna circuitry, a RFID technology based communications circuitry, a smart memory module interface, and a radio frequency signal switch. The antenna circuitry is arranged to transmit and receive data carrying radio frequency (RF) signals to/from any counterpart device being equipped with a corresponding counterpart interface. The smart memory module interface is arranged to interface with at least one smart memory module when the smart memory module is present at the smart memory module interface. The radio frequency signal switch is operatively connected to the antenna circuitry. The radio frequency signal switch is further adapted to switch the antenna circuitry to be operatively connected with one of the RFID technology based communications circuitry of the terminal device and the RFID technology based communications circuitry of the smart memory module. Means for generating a switching signal are provided in order to control operation of the radio frequency signal switch. The switching signal is generated on the basis of at least criteria whether the smart memory module is present at the smart memory module interface.

29 Claims, 6 Drawing Sheets

(51) Int. Cl.
*G06K 7/10* (2006.01)
*G06K 19/073* (2006.01)
*G06K 19/077* (2006.01)
*H04B 5/00* (2006.01)

(52) U.S. Cl.
CPC ...... *G06K19/0724* (2013.01); *G06K 19/07345* (2013.01); *G06K 19/07786* (2013.01); *H04B 5/00* (2013.01); *H04B 5/0062* (2013.01); *H04B 5/0068* (2013.01)

(56) References Cited

U.S. PATENT DOCUMENTS

| | | | |
|---|---|---|---|
| 2002/0082989 A1* | 6/2002 | Fife et al. | 705/39 |
| 2003/0213849 A1* | 11/2003 | Luu | 235/492 |
| 2004/0124969 A1* | 7/2004 | Okada | 340/5.72 |
| 2004/0229655 A1 | 11/2004 | Jang | |
| 2005/0077356 A1 | 4/2005 | Takayama et al. | |
| 2006/0130101 A1* | 6/2006 | Wessel van Rooyen | 725/100 |
| 2006/0203757 A1* | 9/2006 | Young et al. | 370/315 |

FOREIGN PATENT DOCUMENTS

| | | |
|---|---|---|
| EP | 0658045 | 6/1995 |
| JP | 2005-064822 | 3/2005 |
| KR | 10-2006-0112301 A | 10/2006 |

OTHER PUBLICATIONS

The Office Action with English translation of parallel Chinese application No. 2005-80049971.4 dated Oct. 11, 2010, 11 pages.
Office action with English translation from Chinese Application No. 2005-80049971.4 dated Jul. 21, 2011, 7 pages.
The Office action with English translation of parallel Chinese application No. 2005-80049971.4 dated Apr. 13, 2010, 7 pages.
Office action with English translation from Chinese Application No. 2005-80049971.4 dated Nov. 2, 2011, 6 pages.

* cited by examiner

DEVICE, MODULE AND METHOD FOR SHARED ANTENNA OPERATION IN A RFID TECHNOLOGY BASED COMMUNICATION ENVIRONMENT

FIELD OF THE INVENTION

The present invention relates to the field of wireless data communication. The present invention relates in particular to the field of near field communication enabled detachable memory modules.

Generally, the present invention addresses the field of local communication technology, such as those short-range communications technologies involving electromagnetic/electrostatic-coupling technologies and optical short-range communication technologies, namely especially near field communication technologies (NFC). In one possible embodiment of the RFID communication, electromagnetic and/or electrostatic coupling is implemented in the radio frequency (RF) portion of the electromagnetic spectrum, using for example radio frequency identification (RFID) technology, which primarily includes radio frequency identification (RFID) transponders, designated radio frequency (RFID) tags for simplicity, and radio frequency identification transponder readers, designated radio frequency (RFID) readers for simplicity.

BACKGROUND

Typically, radio frequency identification (RFID) transponders are widely used for labeling objects, to establish person's identities and to recognize objects provided with radio frequency identification (RFID) transponders. Basically, radio frequency identification (RFID) transponders include an electronic circuit with data storage capacity and a radio frequency (RF) interface and high frequency (HF) interface, respectively, which couples an antenna to the electronic circuit. The radio frequency identification (RFID) transponders are typically accommodated in small containers. Depending on the requirements made on the deployment of the radio frequency identification (RFID) transponders (i.e. the data transmission rate, energy of the interrogation, transmission range etc.) different types are provided for data provision and transmission on different radio frequencies, for example within a range from several 10-100 kHz to some GHz, respectively, (e.g. 134 kHz, 13.56 MHz, 860-928 MHz, 2.4 GHz etc; only for illustration). Two main classes of radio frequency identification (RFID) transponders can be distinguished, i.e. active and passive transponders. Passive radio frequency identification (RFID) transponders are activated and energized by radio frequency identification (RFID) readers generating an interrogation signal, for example one or more radio frequency (RF) signals at one or more predefined certain frequencies. So, in other words, passive radio frequency identification (RFID) transponders does not need own power source for communication. Active radio frequency identification (RFID) transponders comprise their own power supplies such as batteries or accumulators for energizing. A large number of RFID communications based application are envisaged including for instance article labeling, electronic article and production surveillance and management, health care, pharmaceutics, retail logistics, electronic ticketing and payment applications, etc. For instance, MIFARE standard from Philips Electronics is one example of RFID communications standard, which provides electronic ticketing applications in public transportation system services.

An evaluation of the RFID communication has been developed, which is known as Near Field Communication (NFC) standards comprising standards for Near Field Communication (NFC) Interface and Protocol (NFCIP-1/NFCIP-2) using inductive coupled devices operating at the centre frequency of 13.56 MHz for interconnection of processor based (peripheral) devices. The standards defines both the Active and the Passive communication modes of Near Field Communication Interface and Protocol (NFCIP-1/NFCIP-2) to realize a communication network using Near Field Communication enabled devices for networked products and also for consumer equipment. The NFC standards specifies, in particular, modulation schemes, codings, transfer speeds, and frame format of the RF interface, as well as initialization schemes and conditions required for data collision control during initialization. Furthermore, the NFC standards define a transport protocol including protocol activation and data exchange methods. Information interchange between systems also requires, at a minimum, agreement between the interchange parties upon the interchange codes and the data structure. More information of the NFC communication standards can be found e.g. from the NFC Forum, Wakefield, Mass. 01880, USA (www.nfc-forum.org).

In view of the broad application of RFID communications and related communications technologies including especially Near Field Communications, portable CE devices, especially cellular phones, Personal Digital Assistants (PDA), etc, will be brought to market, which portable CE devices are capable with RFID communications and/or related communication standards. Such portable CE devices are equipped preferably with communication equipment capable of operating in roles of transponder devices and/or reader devices that allow the devices to provide, sense, capture, read, and/or write digital information in accordance with any RFID communication standard including Near Field Communication (NFC) standards, and/or any local RF communication standard related thereto.

With reference to electronic ticketing/payment solutions, confidential information has to be handled and service providers will implement their own specific security and authentication implementations. In principle, the implementation of electronic ticketing/payment solutions e.g. on the basis of an NFC-enabled portable CE device is possible, but will require complex and time-consuming standardization. Moreover, it seems doubtful, whether the service providers for electronic ticketing/payment solutions including e.g. public transportation service providers, credit card providers, etc, will have the will for implementation on a common standard. On the contrary, it has to be expected that electronic ticketing/payment solutions will be established on the basis of individual RFID transponders issued by the electronic ticketing/payment service providers. Envisaged solutions are based on detachable (smart) memory modules, preferably with a secured memory and cryptographic element, having their own radio frequency interface for wireless data communications. Those skilled in the art will appreciate that the presence of multiple radio frequency implementations is neither desirable nor advantageous.

SUMMARY

An object of the invention is to provide an economically preferable integration of several RFID-based communication transponders in a RFID/NFC communication enabled portable CE device. Another object of the invention is to provide user controllability of RFID-based communication operable with RFID-based communication transponders attached to the portable CE device.

The objects of the present invention are solved by the subject matter defined in the accompanying independent claims.

According to a first aspect of the present invention, a mobile terminal device is provided, which comprises an antenna circuitry, a RFID technology based communications circuitry, a smart memory module interface, and a radio frequency signal switch. The antenna circuitry is arranged to transmit and receive data carrying radio frequency (RF) signals to/from any counterpart device being equipped with a corresponding counterpart interface. The smart memory module interface is arranged to interface with at least one smart memory module when the smart memory module is present at the smart memory module interface. The smart memory module comprises a RFID technology based communications circuitry. The radio frequency signal switch is operatively connected to the antenna circuitry. The radio frequency signal switch is further adapted to switch the antenna circuitry to be operatively connected with one of the RFID technology based communications circuitry of the terminal device and the RFID technology based communications circuitry of the smart memory module. Means for generating a switching signal are provided in order to control operation of the radio frequency signal switch. The switching signal is generated on the basis of at least criteria whether the smart memory module is present at the smart memory module interface.

According to an embodiment of the present invention, the means for generating the switching signal further consider at least criteria comprising at least one out of a group comprising switching on of the smart memory module, activation of one or more components of the smart memory module, reception of a command issued by an application operable with the terminal device, reception of a command upon input of a user of the terminal device, indication from a counterpart device, and context information available to the terminal device.

According to an embodiment of the present invention, the RFID technology based communications circuitry of the smart memory module is operatively connectable through the smart memory module interface.

According to an embodiment of the present invention, the radio frequency signal switch is adapted to selectively switching between the RFID technology based communications circuitry of the terminal device and the RFID technology based communications circuitry of the smart memory module.

According to an embodiment of the present invention, one or more matching circuitries are interposed in a radio frequency signal path established by the radio frequency signal switch between antenna circuitry and one of the RFID technology based communications circuitry of the terminal device and the RFID technology based communications circuitry of the smart memory module. The matching circuitries are arranged to adjust characteristics between the antenna circuitry and the switched RFID technology based communications circuitry.

According to an embodiment of the present invention, the switching of the radio frequency signal switch is performed upon reception of an acknowledgement.

According to an embodiment of the present invention, an original switching state of the radio frequency signal switch is restored.

According to an embodiment of the present invention, the RFID technology based communications circuitry of the smart memory module is operable as a RFID transponder module and/or RFID reader module and/or the RFID technology based communications circuitry of the terminal device is operable in accordance with the Near Field Communication (NFC) standard.

According to an embodiment of the present invention, the smart memory module is detachably connected to the smart memory module interface of the mobile terminal device.

According to a second aspect of the present invention, a method for controlling a mobile terminal device is provided. The terminal device comprises a RFID technology based communications circuitry, an antenna circuitry, and a smart memory module interface arranged to interface with at least one smart memory module when the smart memory module is present at the smart memory module interface. The smart memory module comprises a RFID technology based communications circuitry. The antenna circuitry is arranged to transmit and receive data carrying radio frequency (RF) signals. A switching signal is generated for controlling operation of a radio frequency signal switch based on at least criteria whether the smart memory module is present at the smart memory module interface. By the means of a radio frequency signal switch, the antenna circuitry is switched to be operatively connected with one of the RFID technology based communications circuitry of the terminal device and the RFID technology based communications circuitry of the smart memory module. The radio frequency signal switch is operatively connected to the antenna circuitry.

According to an embodiment of the present invention, the switching signal is generated on the basis of a criteria comprising to at least one out of a group comprising switching on of the smart memory module, activating one or more components of the smart memory module, receiving a command issued by an application operable with the terminal device, receiving a command upon input of a user of the terminal device, indication from a counterpart device, and context information available to the terminal device.

According to an embodiment of the present invention, the RFID technology based communications circuitry of the smart memory module is operatively connected through the smart memory module interface.

According to an embodiment of the present invention, the radio frequency signal switch switches selectively between the RFID technology based communications circuitry of the terminal device and the RFID technology based communications circuitry of the smart memory module.

According to an embodiment of the present invention, (electric) characteristics are adjusted between the antenna circuitry and the switched RFID technology based communications circuitry by the means of one or more matching circuitries interposed in a radio frequency signal path established by the radio frequency signal switch.

According to an embodiment of the present invention, the switching of the radio frequency signal switch is performed upon reception of an acknowledgement.

According to an embodiment of the present invention, a switching state of the radio frequency signal switch is restored.

According to an embodiment of the present invention, the RFID technology based communications circuitry of the smart memory module is operable as a RFID transponder module and/or RFID reader module; and/or the RFID technology based communications circuitry of the terminal device is operable in accordance with Near Field Communication standard.

According to an embodiment of the present invention, the smart memory module is detachably connected with the terminal device.

According to an embodiment of the present invention, the radio frequency signal path between the antenna circuitry and the smart memory module is established in response to connecting the smart memory (smartcard) module to the terminal device.

According to a third aspect of the present invention, computer program product for controlling a mobile terminal device is provided. The computer program product comprises program code sections for carrying out the steps of the method according to an aforementioned embodiment of the invention, when the program is run on a computer, a terminal, a network device, a mobile terminal, a mobile communication enabled terminal or an application specific integrated circuit. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a fourth aspect of the present invention, a computer program product is provided, which comprises program code sections stored on a machine-readable medium for carrying out the steps of the method according to an aforementioned embodiment of the invention, when the computer program product is run on a computer, a terminal, a network device, a mobile terminal, or a mobile communication enabled terminal.

According to a fifth aspect of the present invention, a computer data signal embodied in a carrier wave and representing instructions is provided which when executed by a processor cause the steps of the method according to an aforementioned embodiment of the invention to be carried out.

According to a sixth aspect of the present invention, a smart memory module is provided, which comprises a RFID technology based communications circuitry. The smart memory module is arranged for being connectable with a smart memory module interface of a mobile terminal device. The mobile terminal device comprises an antenna circuitry, a RFID technology based communications circuitry, a smart memory module interface, and a radio frequency signal switch. The antenna circuitry is arranged to transmit and receive data carrying radio frequency (RF) signals to/from any counterpart device being equipped with a corresponding counterpart interface. The smart memory module interface is arranged to interface with at least one smart memory module when the smart memory module is present at the smart memory module interface. The radio frequency signal switch is operatively connected to the antenna circuitry. The radio frequency signal switch is further adapted to switch the antenna circuitry to be operatively connected with one of the RFID technology based communications circuitry of the terminal device and the RFID technology based communications circuitry of the smart memory module. Means for generating a switching signal are provided in order to control operation of the radio frequency signal switch. The switching signal is generated on the basis of at least criteria whether the smart memory module is present at the smart memory module interface.

According to an embodiment of the present invention, a matching circuitry is comprised by the smart memory module. The matching circuitry is arranged to adjust characteristics between an antenna circuitry of a terminal device and the RFID technology based communications circuitry of the smart memory module.

According to an embodiment of the present invention, the smart memory module includes a protected data storage for storing confidential data. The protected data storage is preferably arranged by the means of a smart card or smart card module, which is adapted to meet security requirement.

According to an embodiment of the present invention, the smart memory module is detachably connectable with the smart memory interface of the terminal device.

According to an embodiment of the present invention, the smart memory module is arranged to provide a radio frequency signal connector intended to supply and/or receive radio frequency signals via the antenna of the mobile terminal device, a presence signal to the terminal device, the switching signal to the terminal device, a data connector intended for data and/or instruction exchange with the mobile terminal device, and/or a power connector for receiving a supply voltage. Preferably, the smart memory module is arranged to fit with connectors of the smart memory module interface provided by the mobile terminal device for accepting the smart memory module.

According to a seventh aspect of the present invention, a system is provided, which comprises a mobile terminal device and at least one smart memory module. The smart memory module comprises a RFID technology based communications circuitry. The mobile terminal device comprises an antenna circuitry, a RFID technology based communications circuitry, a smart memory module interface, and a radio frequency signal switch. The antenna circuitry is arranged to transmit and receive data carrying radio frequency (RF) signals to/from any counterpart device being equipped with a corresponding counterpart interface. The smart memory module interface is arranged to interface with at least one smart memory module when the smart memory module is present at the smart memory module interface. The radio frequency signal switch is operatively connected to the antenna circuitry. The radio frequency signal switch is further adapted to switch the antenna circuitry to be operatively connected with one of the RFID technology based communications circuitry of the terminal device and the RFID technology based communications circuitry of the smart memory module. Means for generating a switching signal are provided in order to control operation of the radio frequency signal switch. The switching signal is generated on the basis of at least criteria whether the smart memory module is present at the smart memory module interface.

According to an eighth aspect of the present invention, a module for controlling a mobile terminal device is provided. The mobile terminal device comprises an antenna circuitry, a RFID technology based communications circuitry, a smart memory module interface, and a radio frequency signal switch. The antenna circuitry is arranged to transmit and receive data carrying radio frequency (RF) signals to/from any counterpart device being equipped with a corresponding counterpart interface. The smart memory module interface is arranged to interface with at least one smart memory module when the smart memory module is present at the smart memory module interface. The smart memory module comprises a RFID technology based communications circuitry. The radio frequency signal switch is operatively connected to the antenna circuitry. The radio frequency signal switch is further adapted to switch the antenna circuitry to be operatively connected with one of the RFID technology based communications circuitry of the terminal device and the RFID technology based communications circuitry of the smart memory module. Means for generating a switching signal, which are comprised by the module for controlling, are provided in order to control operation of the radio frequency signal switch. The switching signal is generated on the basis of at least criteria whether the smart memory module is present at the smart memory module interface.

According to an embodiment of the present invention, the mobile terminal device is a mobile terminal device according to any of the aforementioned embodiments of the present invention and/or the smart memory module is a smart memory module according to any of the aforementioned embodiments of the present invention.

BRIEF DESCRIPTION OF THE DRAWINGS

The accompanying drawings are included to provide a further understanding of the invention and are incorporated in and constitute a part of this specification. The drawings illustrate embodiments of the present invention and together with the description serve to explain the principles of the invention. In the drawings.

DETAILED DESCRIPTION OF EMBODIMENTS OF THE INVENTION

Advantages of the present invention will become apparent to the reader of the present invention when reading the detailed description referring to embodiments of the present invention, based on which the inventive concept is easily understandable. Throughout the detailed description and the accompanying drawings same or similar components, units, or devices will be referenced by same reference numerals for clarity purposes.

It shall be noted that the designations terminal device, portable device, mobile device and portable consumer electronic (CE) device are used synonymously throughout the description.

Figure 1:
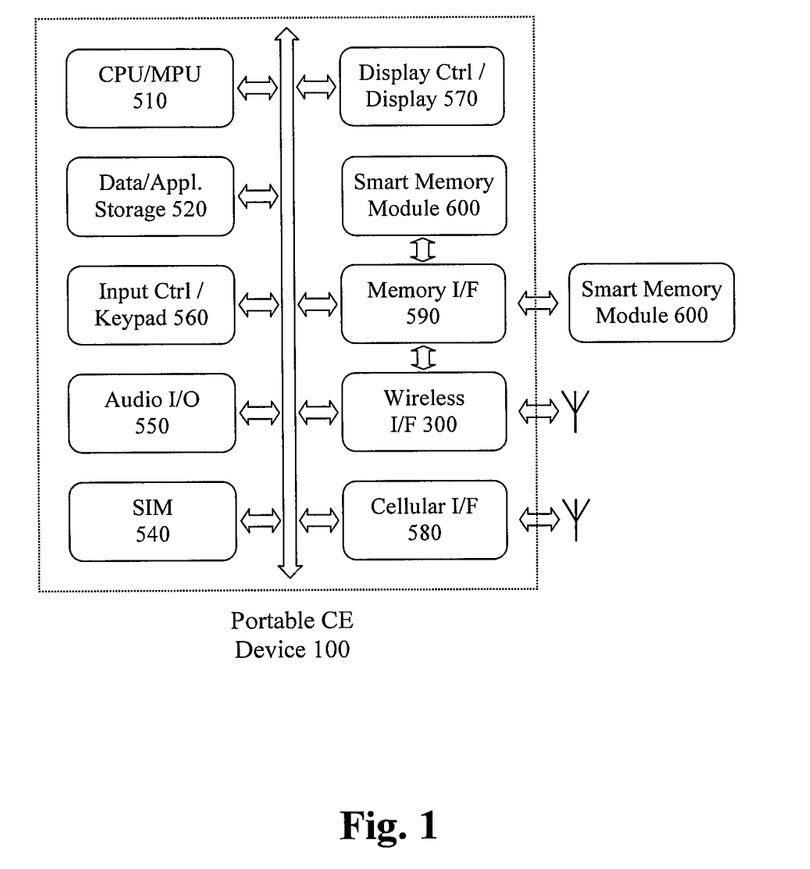
FIG. 1 depicts a schematic block diagram illustrating an electronic device according to an embodiment of the present invention.

With reference to FIG. 1 an introduction to functional and structural components, which may be implemented in a portable consumer electronic (CE) device 100 according to an embodiment of the inventive concept, will be presented and described in detail.

FIG. 1 illustrates schematically an example user terminal on the basis of an implementation of a portable consumer electronic (CE) device 100 according to an embodiment of the present invention. The block diagram of FIG. 1 depicts a principle structural design of a cellular terminal of the way of illustration. It should be noted that the present invention is not limited to the exemplary portable CE device 100 illustrated in FIG. 1. Rather, it should be understood that the present invention is operable with any kind of portable user terminal including especially cellular phones, smart phones, personal digital assistants (PDA) and the like user terminals.

The illustrated portable CE device 100 comprises typically a central or mobile processing unit (CPU) 510, a data and application storage 520 (preferably internal), input/output means including audio input/output (I/O) means 550, a keypad with input controller (Ctrl) 560 and a display with display controller (Ctrl) 570.

The operation of the portable CE device 100 is conventionally controlled by the central processing unit (CPU)/mobile processing unit (MPU) 510 typically on the basis of an operating system or any basic controlling application, which controls the functions, features and functionality of the CE device 100 by offering their functionality to the user. The data and application storage 520, which is preferably arranged internally in the portable CE device 100, serves for storing and providing the operating system, one or more applications, application data, and user data including for instance configuration/setup data, contact information, messaging information, calendar information, multimedia data, and the like. The data and application storage 520 is implemented as ROM (read-only memory) and/or RAM (random access memory) and is realized on the basis of known data storage technologies. The display and display controller (Ctrl) 570 are typically controlled by the central/mobile processing unit (CPU/MPU) 510 and provides information for the user including especially a (graphical) user interface (UI) allowing the user to make use of the functions, features and functionality of the CE device 100. The keypad and keypad controller (Ctrl) 560 are provided to enable the user inputting information. The information input via the keypad is conventionally supplied by the keypad controller (Ctrl) to the processing unit (CPU/MPU) 510, which is typically instructed and/or controlled in accordance with the input information. The audio input/output (I/O) means 550 includes for instance a speaker for reproducing an audio signal and/or a microphone for recording an audio signal. The processing unit (CPU/MPU) 510 can control conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry e.g. implemented on the basis of a digital signal processor (DSP, not shown).

Additionally, the portable CE device 100 according to an embodiment of the present invention may include a cellular interface (I/F) 580 coupled to a cellular antenna and operable with a corresponding subscriber identification module (SIM) 540. The cellular interface (I/F) 580 is arranged as a cellular transceiver to receive signals from the cellular antenna, decodes the signals, demodulates them and also reduces them to the base band frequency. The cellular interface 580 provides for an over-the-air interface, which serves in conjunction with the subscriber identification module (SIM) 540 for cellular communications with a corresponding radio access network (RAN) of a public land mobile network (PLMN). The output of the cellular interface (I/F) 580 thus consists of a stream of data that may require further processing by the central processing unit (CPU) 510. The cellular interface (I/F) 580 arranged as a cellular transceiver also receives data from the central processing unit (CPU) 510, which are to be transmitted via the over-the-air interface to the radio access network (RAN). Therefore, the cellular interface (I/F) 580 encodes, modulates and converts the signal to the radio frequency, which is to be used. The cellular antenna then transmits the resulting radio frequency signal to the corresponding radio access network (RAN) of the public land mobile network (PLMN). The cellular interface 580 preferably supports a 2nd generation digital cellular network such as GSM (Global System for Mobile Communications) which may be enabled for GPRS (General Packet Radio Service) and/or EDGE (Enhanced Data for GSM Evolution), UMTS (Universal Mobile Telecommunications System), or any similar or related standard for cellular telephony standard.

Moreover, the portable CE device 100 according to an embodiment of the present invention comprises also a local data interface (I/F) 300 and a data interface (I/F) 590, which is preferable adapted to exchange data and/or instructions with one or more memory module connected thereto in accordance with memory controller functionality. However, it should be noted that in embodiments where the smart card module is integrated into certain modules, there needs to be a direct link to the local data interface (I/F) 300 in order to ensure the time requirement for the transaction.

The wireless short-range data interface (I/F) 300 or wireless short-range transceiver implemented enables the portable CE device 100 for local wireless data communications with any corresponding counterpart network, base station or counterpart receiver or transceiver. The local data interface (I/F) 300 is preferably realized on the basis of a low-power radio frequency (LPRF) transceiver, especially radio frequency identification (RFID) technology including any known or future RFID communication standard and Near Field Communication (NFC) standards, respectively.

Furthermore, an internal (detachable or integrated) smart memory module 600 and/or an external detachable smart memory module 600 are provided. A data interface (I/F) 590 serves for interfacing data and instruction communications between the detachable smart memory modules 600 and the portable CE device 100, i.e. the detachable smart memory modules 600 and the CPU/MPU 510 of the portable CE device 100 controlling the operation thereof. The data interface (I/F) 590 may be established by any appropriate hardware and/or software interfaces, which are available in the state of the art or in future. The smart memory modules 600 are preferably implemented in accordance with the MMC (Multimedia Card), SD (Secure Data), or any comparable memory module standard. The implementation of the smart memory modules 600 according to embodiments of the present invention will be described below in detail with reference to the following figures.

Further, one or more network interfaces in addition to or as an alternative of the above described cellular interface 580 may be implemented in the exemplary portable CE device 100. A large number of wireless network communication standards are today available. For instance, the portable CE device 100 may include one or more wireless network interfaces operating in accordance with any IEEE 802.xx standard, WLAN (wireless local area network) standard, UWB (ultra wideband) standard, Wi-Fi standard, any Bluetooth standard (1.0, 1.1, 1.2, 2.0 ER), ZigBee (for wireless personal area networks (WPANs)), infra-red Data Access (IRDA), any other currently available standards and/or any future wireless data communication standards. Moreover, the network interface implemented in the exemplary portable CE device 100 may (also) support wired networks such as Ethernet LAN (Local Area Network), PSTN (Public Switched Telephone Network), DSL (Digital Subscriber Line), and/or other current available and future standards.

In addition, the portable CE device 100 may include in certain embodiments of the present invention, a broadcast receiver interface (not shown), which allows the portable CE device 100 to access broadcast transmission services that include Digital Video broadcasting (DVB-T, DVB-H), Digital Audio Broadcasting (DAB), Digital Radio Mondiale (DRM), Integrated Services Digital Broadcasting-Terrestrial (ISDB-T), Advanced Television Systems Committee (ATSC) and Digital Multimedia Broadcasting (DMB-T) techniques to name a few.

The portable CE device 100 described above and illustrated with reference to FIG. 1 represents an exemplary embodiment of an electronic device according to an embodiment of the invention, on the basis of which electronic device the inventive concept is implementable. In general, any electronic device including in particular a cellular phone, a Personal Digital Assistant (PDA), a pocket personal computer, a portable personal computer, a communicator terminal or any other (portable) consumer electronics (CE) with processing capability, an appropriate local wireless communication module 300 operable with RFID technology and an appropriate smart memory module 600 connectable to the consumer electronics (CE) is applicable according to the present invention.

The components and modules illustrated in FIG. 1 may be integrated in the portable CE device 100 as separate, individual modules, or in any combination thereof. Preferably, one or more components and modules of the portable CE device 100 may be integrated with the central/mobile processing unit (CPU/MPU) forming a system on a chip (SoC). Such system on a chip (SoC) integrates preferably all components of a computer system into a single chip. A system on a chip (SoC) may contain digital, analog, mixed-signal, and also often radio-frequency functions. A typical application is in the area of embedded systems and portable systems, which are constricted especially to size and power consumption constraints. Such a system on a chip (SoC) consists typically of a number of integrated circuits (ICs) that perform different tasks. These may include one or more components comprising microprocessor (CPU/MPU), memory (RAM: random access memory, ROM: read-only memory), one or more UARTs (universal asynchronous receiver-transmitter), one or more serial/parallel/network ports, DMA (direct memory access) controller chips, GPU (graphic processing unit), DSP (digital signal processor) etc. The recent improvements in semiconductor technology have allowed VLSI (Very-Large-Scale Integration) integrated circuits to grow in complexity, making it possible to integrate all components of a system in a single chip.

The following embodiments will illustrate embodiments of the smart memory module 600 and the interoperation of the smart memory module 600 with the local wireless communication interface 300.

Figure 2A:
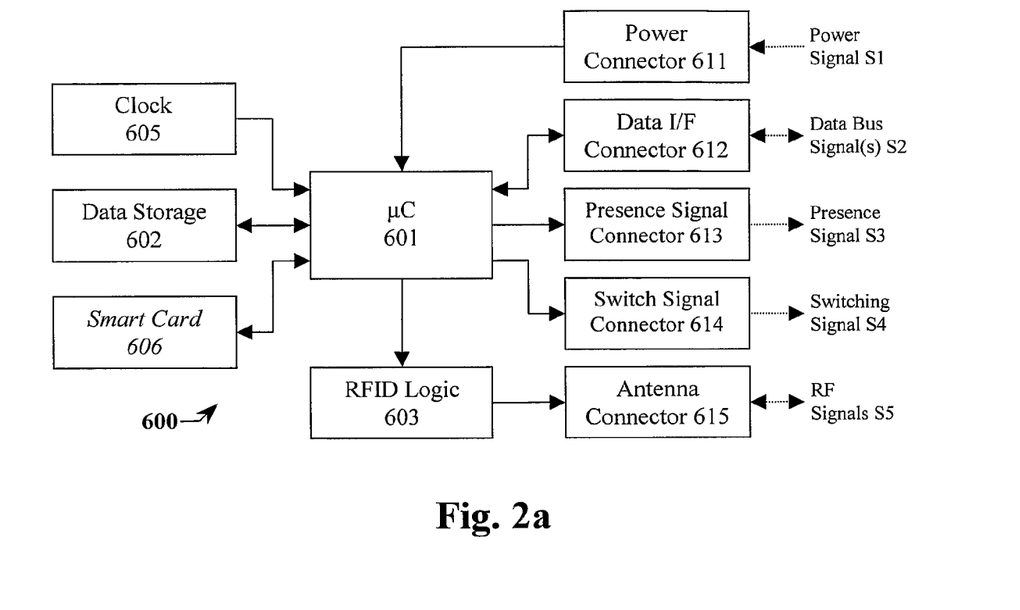
FIG. 2a depicts a schematic block diagram illustrating an embodiment of a smart memory module according to the present invention.
Figure 2B:
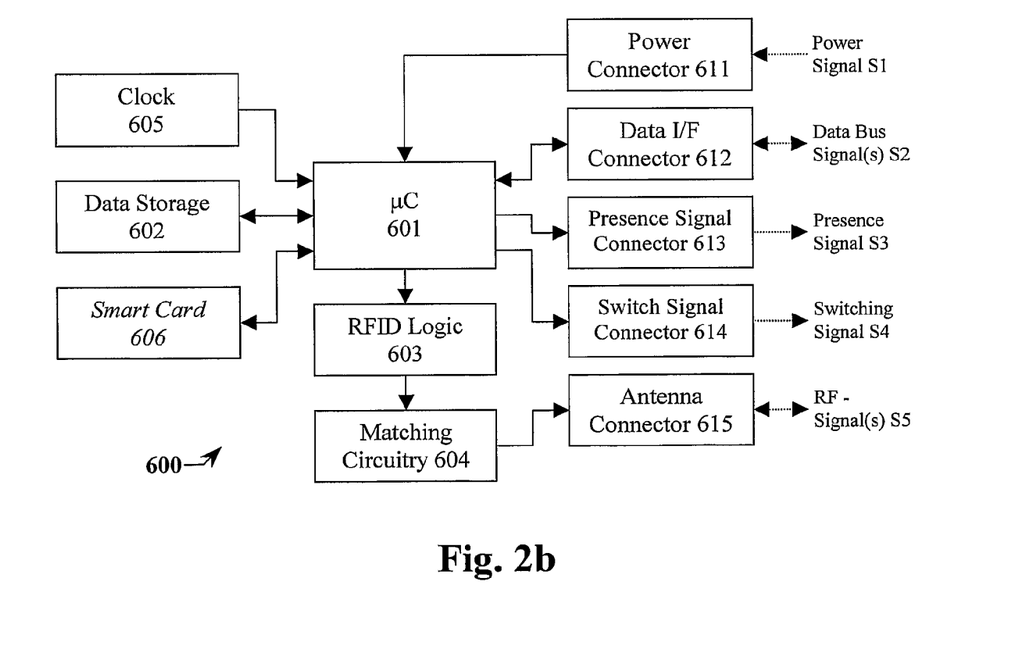
FIG. 2b depicts a schematic block diagram illustrating another embodiment of a smart memory module according to the present invention.

With reference to FIGS. 2a and 2b, schematic block diagrams of a smart memory module 600 according to embodiments of the present invention are illustrated. The smart memory module 600 is preferably controlled by a controlling circuitry, i.e. a µC (micro-controller) 601, which is connected to a data storage 602. The data storage is provided for storing digital information, data, data records, etc. The data storage may be a FLASH random access memory (RAM) enabling read and write access or a read-only memory enabling merely read access. In general, the data storage 602 may be implemented in accordance with any current or future data storage technology. Those skilled will appreciate that the implementation of the data storage is out of the scope of the present invention. On the one hand, the data storage may be accessed for data reading and/or data writing via the data interface (I/F) connector 612, which preferably connects the smart memory module 600 to a corresponding connector of the data interface (I/F) 590 of the portable CE device 100. On the other hand, the data storage may also be accessed for data reading and/or data writing via the RFID circuitry and RFID logic, respectively. The reading and/or writing access is operable in accordance with any current or any RFID technology standard.

Details relating the implementations of the RFID logic and RFID transmission protocols are out of the scope of the present invention. It should be understood that the present invention is not limited to any specific RFID technology and/or transmission protocol.

The radio frequency signal generated by the RFID logic 603 is supplied by the means of an antenna connector 615 to the portable CE device 100. The antenna signal will be described in detail with reference to the embodiments described below with reference to the following figures. With reference to FIG. 2a, the radio frequency signal generated by the RFID logic 603 is supplied directly to the antenna connector 615, whereas with reference to FIG. 2b, the radio frequency signal generated by the RFID logic 603 is supplied via a matching circuitry 604 to the antenna connector 615. The operation of the matching circuitry will be described in detail with reference to the embodiments described below with reference to the following figures.

In principle, the RFID logic 603 is arranged to receive data signals from the µC 601 of the smart memory module 600, which data signals represent data read out from the data storage 602, and embed the data signals onto a radio frequency based-band frequency, which resulting modulated radio frequency signal is provided via the antenna connector 615 for being transmitted by the means of a radio frequency antenna. Depending on the implementation of the data storage 602, the RFID logic 603 can be also arranged to receive a modulated radio frequency signal via the antenna connector 615 for demodulation, which results in one or more data signals. These data signals are supplied to the µC 601. The received and demodulated data signals may represent instructions for instructing the µC 601 and/or data information for being written to the data storage 602. A clock signal required for operation of the µC 601 and the RFID logic 603, respectively, may be provided by a clock generator 605 or may be generated from a radio frequency signal supplied to the RFID logic 603. The RFID logic may be arranged as a RFID transponder module having transponder functionality in accordance with any known or future RFID technology, a RFID reader module having reader functionality in accordance with any known or future RFID technology or RFID module having transponder and reader functionality in accordance with any known or future RFID technology.

A power supply connector 611 is provided to supply the smart memory module 600 with electric energy. The power supply connector 611 is preferably connected to a power supply of the portable CE device, i.e. a battery and/or a rechargeable accumulator. It should be noted that according to alternative embodiment of the present invention, the power to the smart memory module 600 is provided from an external source. In this embodiment, the smart memory module 600 may be operable also in situations where the portable CE device is not powered. Further, according to embodiments of the present invention, a presence signal connector 613 and/or a switching signal connector 614 may be arranged for providing a presence signal as well as an antenna switching signal to the portable CE device. The presence signal and the antenna switching signal will be described in detail with reference to the embodiments described below with reference to the following figures.

According to an embodiment of the present invention, the data storage 602 or at least a part thereof can be a secured/protected memory. Such protected memory is typically arranged for storing confidential data and information, respectively. Typical confidential information is information allowing digital payment transactions or digital ticket information. A protected memory implemented on the basis of the data storage 602 or a protected memory portion thereof is specifically adapted to meet security requirements, which have to be considered to ensure security and privacy aspects relevant in view of the confidential digital information stored therein. Those skilled in the art will appreciate that the handling of the confidential digital information such as digital ticket data and digital payment data as defined above is subjected to security and privacy aspects from user view as well as from service provider view, where the service provider relates to both issuing authorities and accepting authorities of the digital information in question. The security requirements can be accomplished by any cryptography technology enabling ciphering and/or deciphering of data stored in the protected memory or protected memory portion of the data storage 602. Further, the security requirements can also be achieved by access control mechanisms, e.g. by the means of authentication operable with public-key technology. It should be noted that the arrangement of a protected memory as described in brief above is know in the art and out of the scope of the present invention. The present invention is not to be understood as limited to any specific embodiment of the data storage 602.

A protected memory can be provided by the means of a smart card module 606 included in the smart memory module 600. The smart card module 606 meets preferably the above described security requirements, onto which it has to be insist, to allow storing of transaction related data such as credit card data, money card data, electronic ticket data etc. The smart card module 606 may therefore include cryptographic logics, authentication mechanisms and the like in accordance with which the security requirements are met. The security mechanisms included in the smart card module 606 can be based on proprietary or standardized security technology. Each service provider (e.g. credit card transaction service provider, bank, ticketing service provider, public transportations service provider etc.) can implement the smart card module 606 in accordance with its own specifications. It should be noted that detailed implementations and requirements concerning such smart card module 606 or smart cards are out of the scope of the present invention and the present invention is not limited to any specific implementation thereof.

Those skilled in the art will appreciate that the components of the smart memory module 600 are provided for the way of illustration. The present invention is not limited to any specific implementation of the smart memory module 600. In particular, the µC (micro-controller) 601, the clock generator 605, the data storage 602, the smart card module 606 and/or the RFID logic may be implemented on the basis of one or more integrated circuitries. The controlling of the operation of the smart memory module 600 may be likewise achieved by any controlling circuitry designed for controlling and operating the smart memory module accordingly.

In accordance with a possible embodiment of the invention, the smart memory module is preferably detachable connected to a handheld mobile phone, where security requirements are achieved by the user requirement to input a personal identification number (PIN) for activating the handheld mobile phone. The PIN, which is required for switching on, is uniquely associated with the SIM of the handheld mobile phone. Thus the mobile phone when switched off or e.g. when activation of phone from screen saver mode the PIN input protects from unauthorized use of the mobile phone and components attached thereto.

Figure 3A:
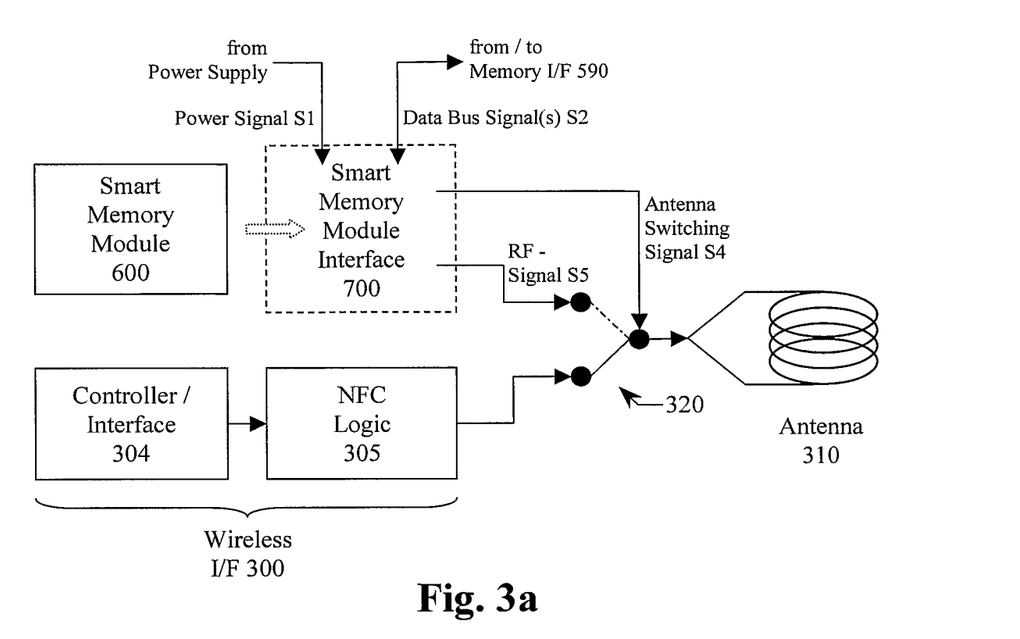
FIG. 3a depicts a schematic block diagram illustrating a first embodiment of the present invention in an operation state.
Figure 3B:
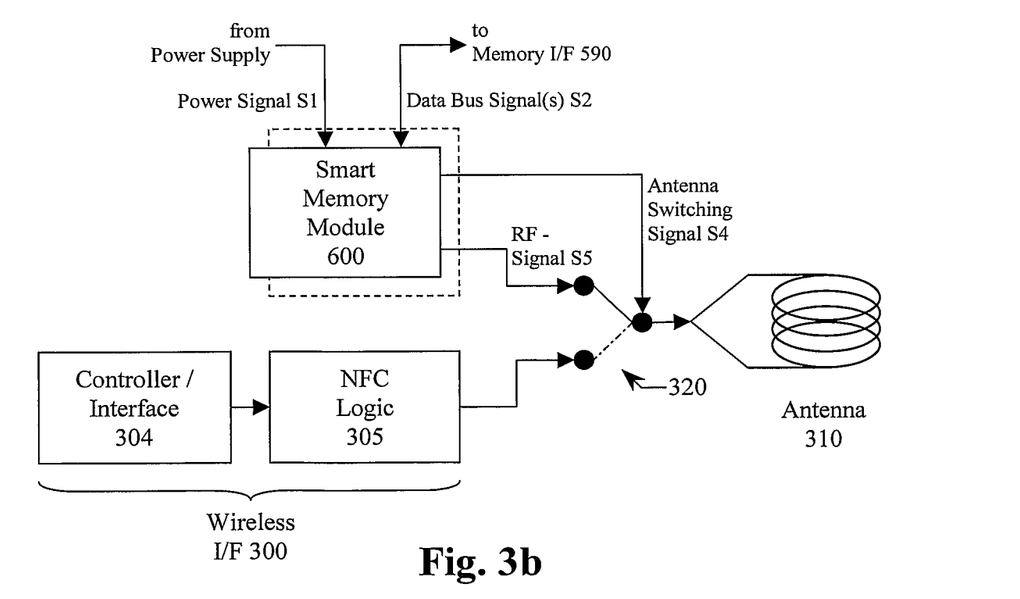
FIG. 3b depicts a schematic block diagram illustrating the first embodiment of the present invention in another operation state.

With reference to FIGS. 3a and 3b, a schematic block diagram of a portable CE device 100 with smart memory module interface 700 for accepting a smart memory module 600 as well as a schematic block diagram of a portable CE device 100 with smart memory module 600 plugged in the corresponding interface 700 according to embodiments of the present invention is illustrated. For the sake of simplicity, the block diagrams shown in FIGS. 3a and 3b are reduced to components and sub-components in accordance with the concept and embodiments of the present invention.

Referring to FIG. 3a, the wireless interface (I/F) 300 described with reference to FIG. 1 is embodied by sub-components including a controller/interface component 304, which accepts data preferably via a data bus from the CPU/MPU 510 of the portable CE device 100. The received data is modulated onto a base-band frequency and supplied by a Near Filed Communication (NFC) circuitry and logic 305 to the corresponding antenna 310, respectively, for being transmitted over the air to a counterpart wireless interface. Moreover, data carrying radio frequency (RF) signals, received via the antenna 310 are supplied to the NFC logic 305 and the controller/interface 304 for demodulation and provision of the data embedded in the received RF signals via the interface 304 for processing by the CPU/MPU 510 of the portable CE device 100. Those skilled in the art will appreciate that the controller/interface 304 and the NFC logic 305 may be comprised by the wireless interface 300 of FIG. 1.

Those skilled in the art will appreciate on the basis of the following description that the NFC logic 305 presented here is just exemplary. The NFC logic should be understood to represent any RFID technology based logic enabling data communication in accordance with any known or future RFID technology.

According to an embodiment of the invention, an antenna signal switching module 320 (designated in the following antenna switch 320, for the sake of simplicity) is interposed between the NFC logic 305 and the antenna 310. In accordance with an antenna switching signal S4, the antenna switch 320 allows to establish a signal connecting between the NFC logic 305 and the antenna 310 as well as an antenna connector arranged in the smart memory module interface 700 and the antenna 310. The antenna connector of the smart memory module interface 700 is operable with the antenna connector 615 of the smart memory module 600 destined for being plugged into the interface 700. This means, in other words that the antenna switch 320 allows selective signal connection between the NFC logic 305 of the portable CE device with the antenna 310 of the portable CE device 100 as well as between the RFID logic 603 of the smart memory module 600 and the antenna 310 of the portable CE device 100.

With reference to FIG. 3b, the smart card module 600 is plugged into the interface 700 and the antenna switching signal S4 generated in response of detecting the presence of the smart memory module 600 at the interface 700, which may be, according to an embodiment of the present invention, generated by the smart card module 600 (i.e. its µC 601) and is supplied to the antenna switch 320 for operating the switching position of the antenna switch 320 according to the above given description. The generation of the antenna switching signal S4 may be controlled in accordance with one or more instructions received by the smart card module 600 via the data interface connector 612 from the data interface (I/F) 590 of the portable CE device 590 or may be autonomously generated by the smart card module 600 (i.e. its µC 601). The switching operation of the antenna switch 320 will be described in more detail with reference to the flow diagram of FIG. 7, which illustrates an operational sequence operable with the antenna switch 320 according to an embodiment of the present invention.

In general, the smart memory module interface 700 provides one or more connectors which are operable with the connectors of the smart memory module 600 illustrated above with reference to FIGS. 2a and 2b according to embodiments of the present invention. In accordance with an embodiment of the present invention, the memory module interface 700 is designed as a slot for accepting to smart memory module 600. It should be noted that the present invention is not limited to any specific mechanical design of the smart memory module interface 700, where the mechanical design may comprise especially any slot arrangement, any holder/support arrangement, any plug-and-socket connection, any cable joint arrangement, and the like. The smart memory module 600 is preferably connected to the data interface 590 having in particular memory controller capability for exchanging data and/or instructions with the portable CE device 100.

Figure 4A:
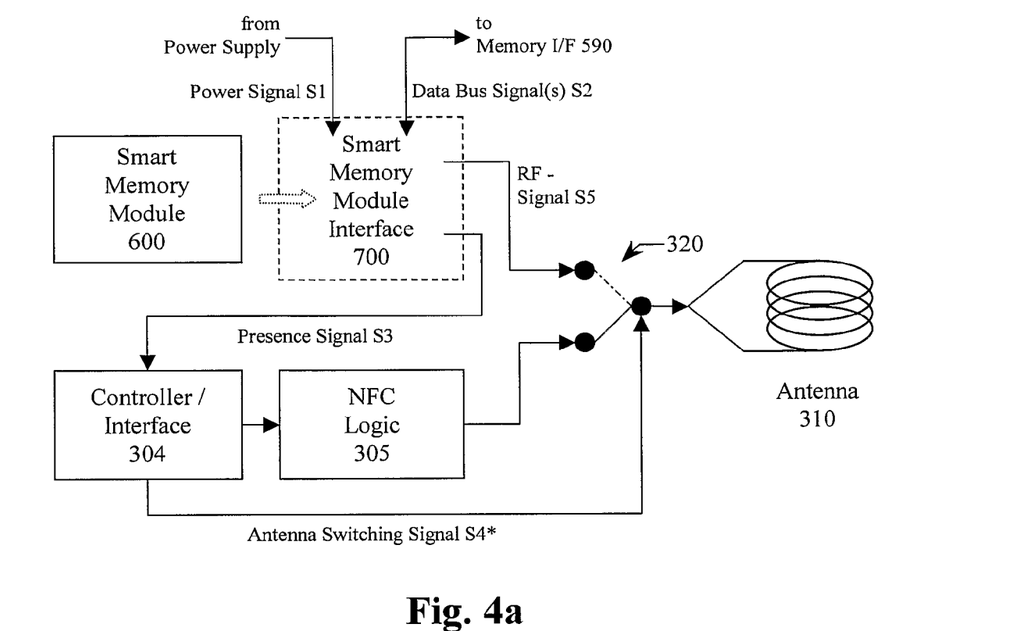
FIG. 4a depicts a schematic block diagram illustrating a second embodiment of the present invention in an operation state.
Figure 4B:
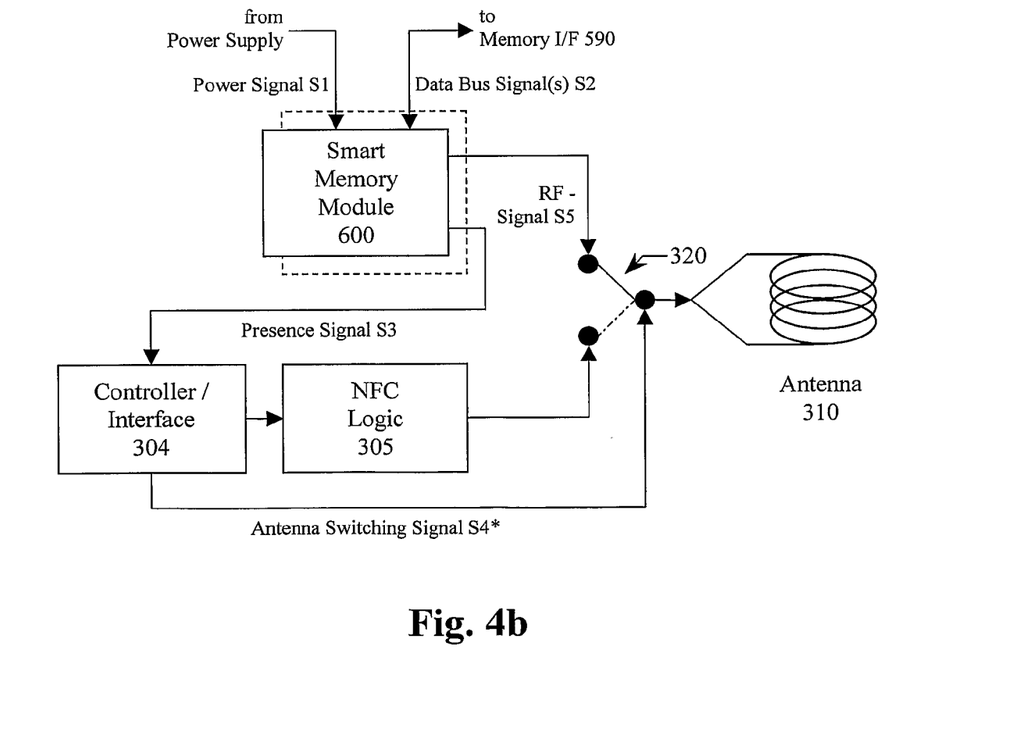
FIG. 4b depicts a schematic block diagram illustrating the second embodiment of the present invention in another operation state.

With reference to FIGS. 4a and 4b, a schematic block diagram of a portable CE device 100 with smart memory module interface 700 for accepting a smart memory module 600 as well as a schematic block diagram of a portable CE device 100 with smart memory module 600 plugged in the corresponding interface 700 according to embodiments of the present invention is illustrated. For the sake of simplicity, the block diagrams shown in FIGS. 4a and 4b are reduced to components and sub-components in accordance with the concept and embodiments of the present invention.

Referring to FIG. 4a, the wireless interface (I/F) 300 described with reference to FIG. 1 is embodied by sub-components including a controller/interface component 304, which accepts data preferably via a data bus from the CPU/MPU 510 of the portable CE device 100. The received data is modulated onto a base-band frequency and supplied by a Near Filed Communication (NFC) circuitry and logic 305 to the corresponding antenna 310, respectively, for being transmitted over the air to a counterpart wireless interface. Moreover, data carrying radio frequency (RF) signals, received via the antenna 310 are supplied to the NFC logic 305 and the controller/interface 304 for demodulation and provision of the data embedded in the received RF signals via the interface 304 for processing by the CPU/MPU 510 of the portable CE device 100. Those skilled in the art will appreciate that the controller/interface 304 and the NFC logic 305 may be comprised by the wireless interface 300 of FIG. 1.

According to an embodiment of the invention, an antenna signal switching module 320 (designated in the following antenna switch 320, for the sake of simplicity) is interposed between the NFC logic 305 and the antenna 310. In accordance with an antenna switching signal S4*, the antenna switch 320 allows to establish a signal connecting between NFC logic 305 and antenna 310 as well as an antenna connector arranged in the smart memory module interface 700 and antenna 310. The antenna connector of the smart memory module interface 700 is operable with the antenna connector 615 of the smart memory module 600 destined for being plugged into the interface 700. This means, the antenna switch 320 allows selective signal connection between NFC logic 305 of the portable CE device with the antenna 310 of the portable CE device 100 as well as between the RFID logic 603 of the smart memory module 600 and the antenna 310 of the portable CE device 100.

With reference to FIG. 4b, the smart card module 600 is plugged into the interface 700 and the antenna switching signal S4* generated by controller/interface 304 of the portable CE device 100 is supplied to the antenna switch 320 for operating the switching position of the antenna switch 320 according to the above given description. The generation of the antenna switching signal S4* is typically controlled CPU/MPU 510 of the portable CE device 590 or can be autonomously generated by the controller interface 304 of the wireless interface 300. The controller interface 304 is supplied with a presence signal S3, which indicates the presence of the smart memory module 600 having RFID logic and functionality in accordance with the concept of the present invention. The presence signal S3 may be generated by and received from the smart memory module 600 via its corresponding presence signal connector 612 according to an embodiment of the present invention. The antenna switching signal S4* is preferably generated by controller/interface 304 of the portable CE device 100 in dependence on the presence signal S3 from the smart memory module 600. The switching operation of the antenna switch 320 will be described in more detail with reference to the flow diagram of FIG. 7, which illustrates an operational sequence operable with the antenna switch 320 according to an embodiment of the present invention.

Figure 5:
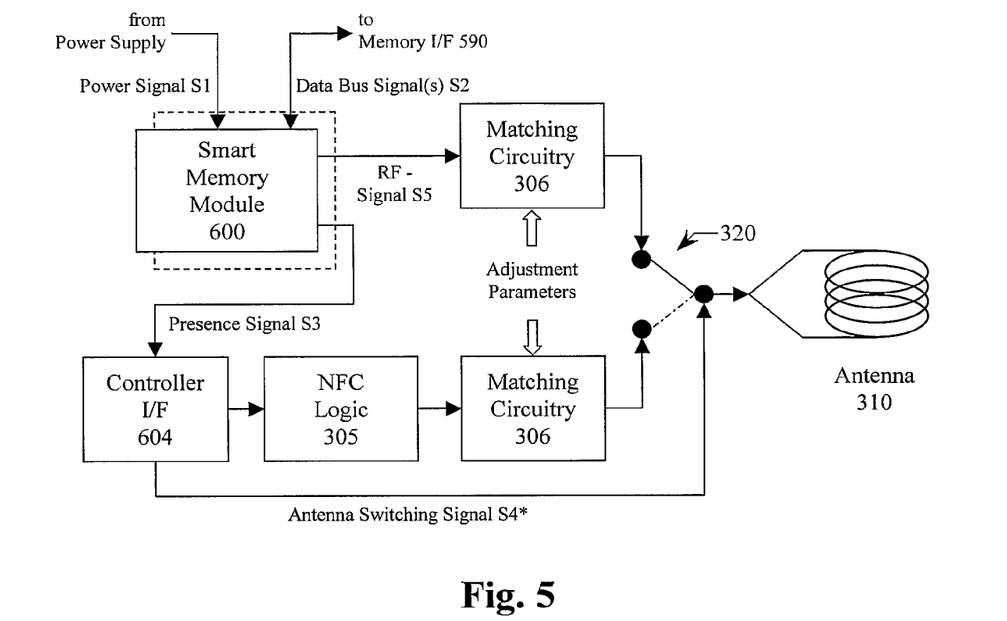
FIG. 5 depicts a schematic block diagram illustrating a third embodiment of the present invention.
Figure 6:
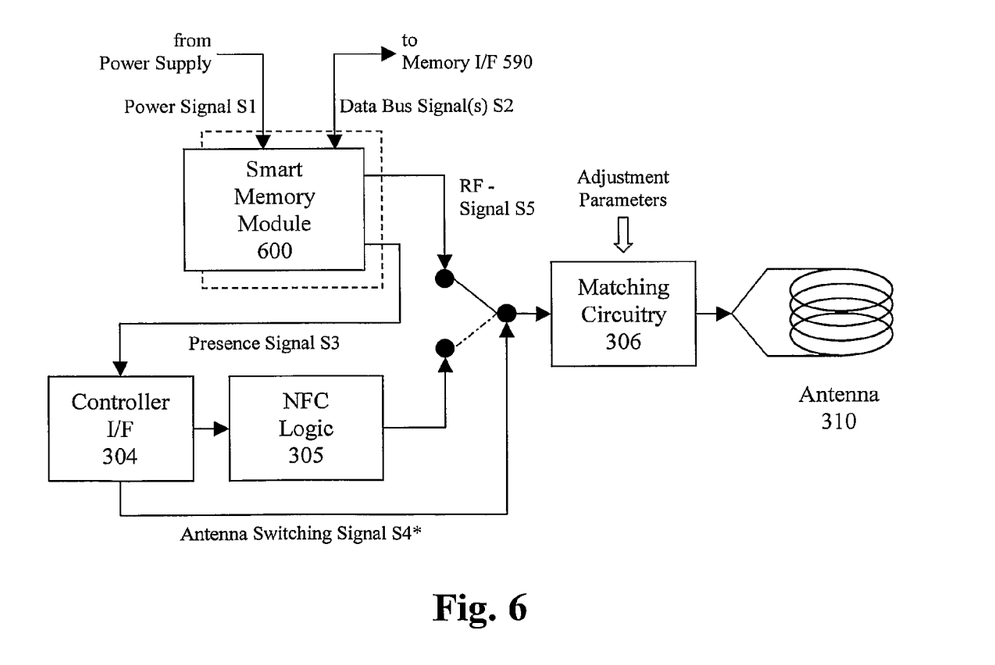
FIG. 6 depicts a schematic block diagram illustrating a fourth embodiment of the present invention.

With reference to FIGS. 5 and 6 a schematic block diagrams illustrating different arrangements of matching circuitries according to embodiments of the present invention are illustrated. A matching circuitry is provided to adjust electric characteristics (electric characteristic values, electric parameters), for instance electric impedance, wave impedance, inductivity, and/or further electric values, to obtain optimal adjustment of the characteristics of the RFID logic 603 and the antenna 310 as well as the NFC logic 305 and the antenna 310 as possible. The characteristic adjustment obtained by the matching circuitry 306 considers the characteristics of the antenna switch 320 interposed between the antenna 310 and the RFID logic 603 as well as the NFC logic 305. According to an embodiment of the present invention, the operation of the matching circuitry 603 may be controllable via adjustment parameters. The adjustment parameters are provided to the matching circuitry 603 in accordance with the individual characteristics of the logic (305, 603), the antenna switch 320, and the antenna 310.

In general, the adjustment of the characteristics by the means of one or more matching circuitry addresses at least one out of a group including improved signal-to-noise radio (SNR), improved RF signal reception sensitivity, and improved transmission strength. Differences in signal path (including connectors) and layout of the logics is to be compensated by the means of matching circuitry/ies.

Referring to FIG. 5, a matching circuitry 306 is interposed in each signal path of the RF signals between the antenna switch 320 and the RFID logic 603 as well as the NFC logic 306, respectively. A first matching circuitry 306 serves for characteristics adjustment between RFID logic 603 and the antenna 310. The smart memory module 600 is preferably arranged in accordance with the embodiment illustrated in FIG. 2a and described in detail with reference thereto.

Referring to FIG. 6, a common matching circuitry 306 is interposed in the signal path of the RF signals between antenna switch 320 and the antenna 310. The common matching circuitry 306 serves for characteristics adjustment between RFID logic 603 and the antenna 310 as well as between NFC logic 305 and the antenna 310. The smart memory module 600 is preferably arranged in accordance with the embodiment illustrated in FIG. 2b and described in detail with reference thereto.

The configurability of the matching circuitry 306 by the means of one or more adjustment parameters can be used in both exemplary embodiments described above with reference to FIGS. 5 and 6. The adjustment parameters may be provided by the NFC logic 305, the controller/interface 304, the RFID logic 603 and/or μC 601. The adjustment parameters are preferably determined on the basis of calibration measurements performed for instance during production testing.

Figure 7:
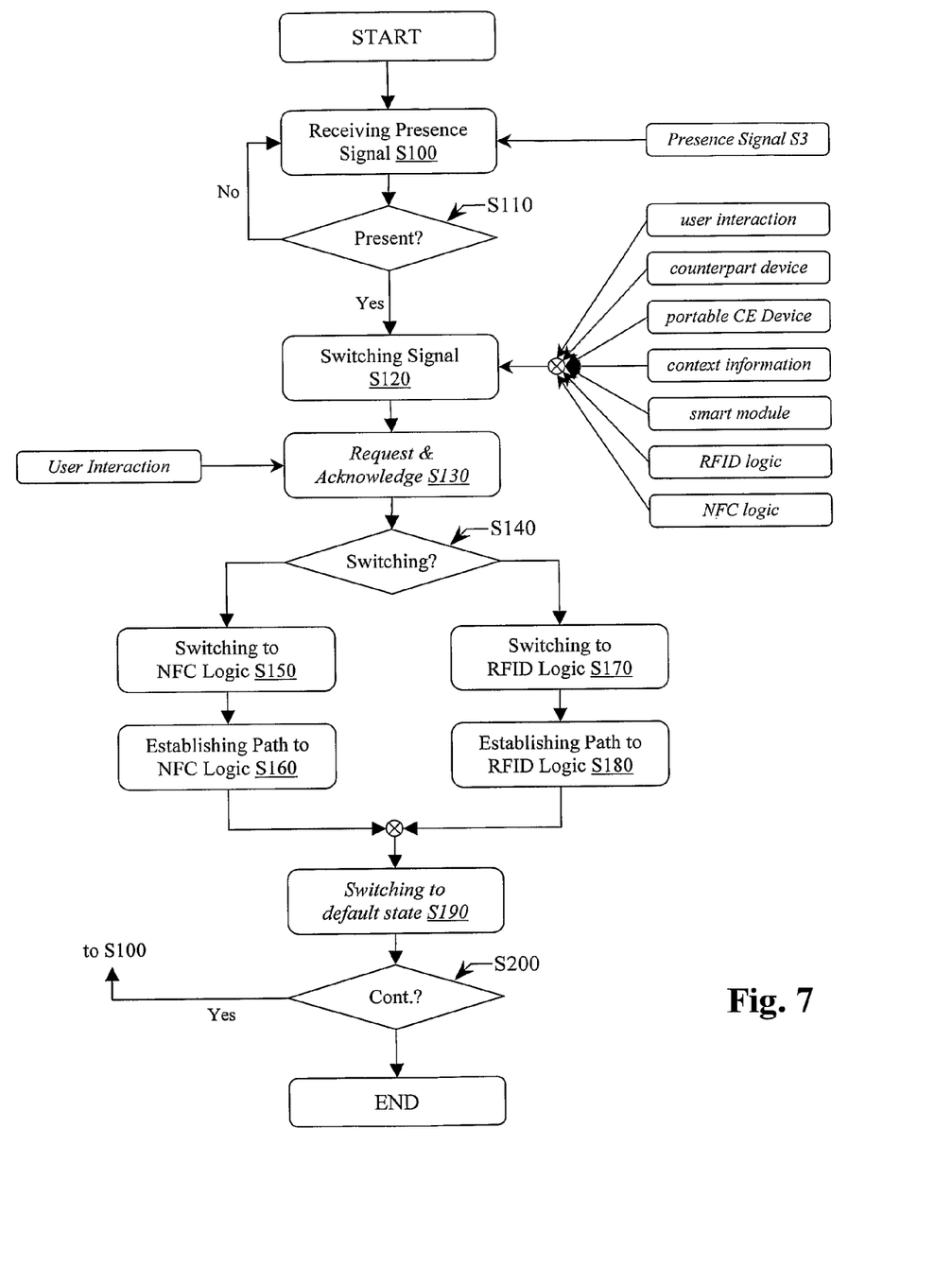
FIG. 7 depicts a schematic flow diagram illustrating an operational sequence according to any embodiment of the present invention.

With reference to FIG. 7, a schematic flow diagram is depicted, which illustrates an operational sequence according to an embodiment of the present invention.

The operational sequence starts and in a first operation the presence of a smart memory module 600 according one of the embodiments described above is checked. In an operation S100, the presence of a smart memory module 600 is detected. The detection may be implemented by way receiving a presence signal S3, which indicates the presence of a smart memory module 600 according an embodiment of the present invention. In an operation S110, the state of the retrieved presence signal S3 is checked. In case, there is not any smart memory module 600 present, the operational sequence returns to the operation for retrieving the presence signal S3. Otherwise, the operational sequence continues.

During absence of a smart memory module 600 according an embodiment of the present invention, the switching state of the antenna switch is set to couple antenna 310 and NFC logic 305.

In an operation S120, it is checked whether an antenna switching signal S4, S4* has to be generated. The generation of the switching signal S4 or S4* may be instructed, performed or initiated on user interaction, by the portable CE device 100, by the smart memory module 600, by a counterpart device e.g. transmitting information that may be interpreted by the portable CE device as commands instructing to switch, by the RFID logic 603 and/or by the NFC logic 305. Those skilled in the art will appreciate that the enumerated events or criteria, upon which an antenna switching signal is generated, are not complete and are merely providing some example embodiments of the present invention.

With reference to the user interaction, the antenna switching signal S4, S4* for switching the antenna switch 320 in one of the possible switching states is generated in response to a user input. The user is enabled to define the switching state of the antenna switch 320 such that the RFID logic 603 or the NFC logic 305 is operable with the antenna 310. Preferably, the functionality for defining the switching state of the antenna switch 320 is operable with the means of a (graphical) user interface, which offers a corresponding input to the user for switching.

With reference to the counterpart device, the switching of the antenna switch and hence the generation of the switching signal S4, S4* is requested, indicated or instructed by a counterpart device. The counterpart device, e.g. a teller machine, a point of sale, a ticketing machine etc. issues preferably a message destined to the portable CE device 100. Upon reception of the message, which can be transmitted via any data interface or data connection present for data exchange between the counterpart device and the portable CE device 100, the portable CE device 100 is informed about the request or instruction to generate a switching signal S4, S4* to switch into a switching state indicated by the counterpart device. The counterpart device, e.g. a point of sale, transmits for instance a message via the NFC connection, a Bluetooth connection, a cellular communication connection, and the like to the portable CE device 100. It should be noted that any data communication interface described with reference to FIG. 1 may be employed. Upon message reception and parsing the portable CE device 100 generates a switching signal S4, S4* switching the antenna switch 320 to establish a RF signal path between antenna 310 and the smart memory module 600, which comprises transaction related information such as credit card data and money card data. After establishment of the RF signal path, the point of sale transmits an interrogation signal to the RFID logic 603 to retrieve the transaction related information.

With reference to the portable CE device, the switching state of the antenna switch 320 is autonomously operated by the portable CE device 100 and one or more applications operable with the portable CE device 100, respectively. For example, an active application may control the switch state of the antenna switch 320 for employing the NFC logic 305 or the RFID logic 603 for retrieving data from any counterpart device, transmitting data to any counterpart device or providing data for retrieval by any counterpart device. Depending on which logic is to be employed, the switching state is controllable by the active application.

With reference to the smart memory module, the antenna switching signal S4, S4* is generated by the smart memory module 600 or any component thereof. For instance, the switching of the antenna switch 320 may be intended with plugging in the smart memory module 600 into the corresponding interface 700 of the portable CE device 100. Moreover, the switching of the antenna switch 320 may be initiated by the smart memory module 600 or any component thereof upon setting the smart memory module 600 or any component thereof into operation or activating any component of the smart memory module 600. For example, the RFID component 603 or the smart card 606 may be activated by reception of one or more instructions over the data interface 590 connecting the smart memory module 600 to the portable CE device 100. The one or more instructions can include sequences relating to authentication and/or access control in order to activate one or more components of the smart memory module 600, especially the RFID component 603 or the smart card 606. In consequence to the activation, the smart memory module generates the antenna switching signal S4 to establish the signal path between the smart memory module 600 and the antenna 310 of the portable CE device 100.

With reference to the NFC logic, the switching signal S4, S4* is generated for instance upon reception of a RF signal via the antenna 310, which is originally intended to be received by the RFID logic 603 of the smart memory module 600. Upon reception of such a RF signal, which may be designated by frequency, modulation structure, embedded data, embedded instructions etc, the NFC logic 305 and/or the controller/interface 304 initiates the generation of the antenna switching signal S4, S4* to establish the signal path between the smart memory module 600 and the antenna 310 of the portable CE device 100.

With reference to the RFID logic, the switching signal S4, S4* is generated for instance upon reception of a RF signal via the antenna 310, which is originally intended to be received by the NFC logic 305 of the portable CE device 100. Upon reception of such a RF signal, which may be designated by frequency, modulation structure, embedded data, embedded instructions etc, the smart memory module 600 initiates the generation of the antenna switching signal S4, S4* to establish the signal path between NFC logic 305 and the antenna 310 of the portable CE device 100.

With reference to context information, any context information may be available to the portable CE device, where the context information include for instance position/location related information indicating that the user of the portable CE terminal is currently within a shop, a shopping mall, a bank hall, a cinema, in the proximity of a teller machine, a ticketing machine, a point of sale, and the like. Independently from the source of the context information and the manner of transmission/reception of the context information, an application operable with the portable CE terminal may decide based on the context information that it is advantageous for the user to generate the antenna switching signal S4, S4* to establish an application-defined signal path.

In summary, the switching of the antenna switch 320 may be based on the presence of the smart memory module, a user-initiated functionality/application selection (in response to one or more UI commands inputted by the user) and/or automated functionality/application selection being based on context information provided to the portable CE device. Those skilled in the art will appreciate that the above given examples may be combined in any manner to enable a situation adapted switching of the antenna switch 320. The antenna switching may be designated criteria/event driven switching in response to a switching criteria/event detected by the portable CE device, components thereof, the smart memory module, and/or any components thereof.

With presence of a generated antenna switching signal S4, S4*, the antenna switch is operated accordingly in operation S140. Before switching, the user of the portable CE device 100 might be informed about the intended switching for instance by notification display, which requests the user to either accept or deny the intended switching. Upon notification, the user is allowed to release or to refuse the switching operation.

In operations S150 and 160, the switching of the antenna switch 320 is released and the signal path between NFC logic 305 and antenna 310 is established. Otherwise, the switching of the antenna switch 320 is released and the signal path between antenna 310 and smart memory module 600 as well as RFID logic 603 thereof is established. Hence, the NFC logic 305 and the RFID logic 603 are operable for data/signal exchange, respectively.

In combination with the establishment of the signal path, the electric characteristics of the antenna and the logic coupled via the established signal path may be adjusted. The adjustment should achieve an inter-operation between the antenna having (layout-specific) basic characteristics and the logics each having also (design-specific) basic characteristics. The adjusting or matching of the characteristics should be as optimal as possible. The adjustment of the characteristics may be obtained by one or more fixed matching circuits interposed in the signal path. The fixed matching circuits are typically provided to match the characteristics of one logic and one antenna. Alternatively, such matching circuits may be configurable in accordance with adjustment parameters determining the matching/adjustment operation of the matching circuits. The adjustment parameters may be stored in a table associating a logic and adjustment parameters adequate for matching. The adjustment parameters may be predefined, provided by the logic, or obtained by test signal generation and analysis.

After completion of the data exchange operation, the antenna switch 320 might return into a default switching state, in operation S190. In operation S200, the operational sequence either returns to operation S100 for repeated performing of the operational sequence or end.

Those skilled in the art will appreciate on the basis of the above given description that the inventive concept is not limited to one smart memory module detachably connected to the portable CE device. The antenna switch 320 can be arranged for switching more than two RF signal terminals to the common antenna terminal connected to the common antenna 310 of the portable CE device. Moreover, the embodiments of the present invention described above have been carried out on the basis of a NFC logic being comprised by the portable CE device 100 and a RFID logic comprised by the smart memory module 600. The NFC logic as well as the RFID logic represents exemplary embodiments of communication logic units supporting data communication on the basis of RFID technology. The inventive concept according to the present invention can be realized by the means of any RFID technology based logics comprised by the smart memory module 600 and comprised by the CE device 100.

It is obvious for those skilled in the art that as the technology advances, the inventive concept can be implemented in a broad number of ways. The invention and its embodiments are thus not limited to the examples and specific embodiments described above but may vary within the scope of the claims.

The invention claimed is:

1. An apparatus comprising:
   at least one processor;
   antenna circuitry configured to transmit and receive data carrying radio frequency (RF) signals;
   a RFID technology based communications circuitry;
   a smart memory module interface configured to interface with at least one smart memory module when said smart memory module is present at said smart memory module interface, said smart memory module comprising a RFID technology based communications circuitry, wherein said smart memory module is configured to perform at least one of a wireless payment transaction and a wireless ticketing transaction;
   a radio frequency signal switch operatively connected to said antenna circuitry and configured to switch said antenna circuitry to be operatively connected with one of said RFID technology based communications circuitry of said apparatus and said RFID technology based communications circuitry of said smart memory module; and
   storage including executable instructions, the storage and the executable instructions being configured to, in cooperation with the at least one processor, cause the apparatus to generate a switching signal for controlling operation of said radio frequency signal switch, based on at least a criteria comprising whether said smart memory module is present at said smart memory module interface and reception of a switching command issued by an active application operable with the apparatus, to control whether said smart memory module performs said at least one of a wireless payment transaction and a wireless ticketing transaction.

2. An apparatus according to claim 1, wherein generating said switching signal is further based on a criteria comprising at least one out of a group comprising switching on of said smart memory module, activation of one or more components of said smart memory module, reception of a command issued by an application operable with said apparatus, reception of a command upon input of a user of said apparatus, indication from a counterpart device, and context information available to said apparatus.

3. An apparatus according to claim 1, wherein said RFID technology based communications circuitry of said smart memory module is operatively connectable through said smart memory module interface.

4. An apparatus according to claim 1, wherein said radio frequency signal switch is configured to selectively switch between said RFID technology based communications circuitry of said apparatus and said RFID technology based communications circuitry of said smart memory module.

5. An apparatus according to claim 1, further comprising:
   one or more matching circuitries interposed in a radio frequency signal path established by said radio frequency signal switch between antenna circuitry and one of said RFID technology based communications circuitry of said apparatus and said RFID technology based communications circuitry of said smart memory module,
   said matching circuitries being configured to adjust characteristics between said antenna circuitry and said RFID technology based communications circuitry in dependence on said established radio frequency signal path.

6. An apparatus according to claim 1, wherein said switching of said radio frequency signal switch is performed upon reception of an acknowledgement.

7. An apparatus according to claim 1, wherein an original switching state of said radio frequency signal switch is restored.

8. An apparatus according to claim 1,
   wherein said RFID technology based communications circuitry of said smart memory module is operable as a RFID transponder module and/or RFID reader module and/or
   wherein said RFID technology based communications circuitry of said apparatus is operable in accordance with the Near Field Communication (NFC) standard.

9. An apparatus according to claim 1, wherein said smart memory module is detachably connected to said smart memory module interface of said apparatus.

10. An apparatus according to claim 1, further comprising a controller for controlling said switching.

11. Method for controlling a mobile terminal device comprising an antenna circuitry, which is configured to transmit and receive data carrying radio frequency (RF) signals, a RFID technology based communications circuitry, and a smart memory module interface configured to interface with at least one smart memory module when said smart memory module is present at said smart memory module interface, said smart memory module comprising a RFID technology based communications circuitry, wherein said smart memory module is configured to perform at least one of a wireless payment transaction and a wireless ticketing transaction, wherein said method comprises:
   generating a switching signal for controlling operation of a radio frequency signal switch, based on at least a criteria whether said smart memory module is present at said smart memory module interface and reception of a switching command issued by an active application operable with the mobile terminal device, to control whether said smart memory module performs said at least one of a wireless payment transaction and a wireless ticketing transaction; and
   switching, by a radio frequency signal switch, said antenna circuitry to be operatively connected with one of said RFID technology based communications circuitry of said terminal device and said RFID technology based communications circuitry of said smart memory module, said radio frequency signal switch being operatively connected to said antenna circuitry.

12. Method according to claim 11, wherein said switching signal is generated on the basis of a criteria comprising at least one out of a group comprising switching on of said smart memory module, activating one or more components of said smart memory module, receiving a command issued by an application operable with said terminal device, receiving a command upon input of a user of said terminal device, indication from a counterpart device, and context information available to said terminal device.

13. Method according to claim 11, further comprising: operatively connecting said RFID technology based communications circuitry of said smart memory module through said smart memory module interface.

14. Method according to claim 11, further comprising:
selectively switching between said RFID technology based communications circuitry of said terminal device and said RFID technology based communications circuitry of said smart memory module.

15. Method according to claim 11, further comprising:
adjusting characteristics between said antenna circuitry and said switched RFID technology based communications circuitry using one or more matching circuitries interposed in a radio frequency signal path established by the radio frequency signal switch.

16. Method according to claim 11, further comprising:
switching of said radio frequency signal switch upon reception of an acknowledgement.

17. Method according to claim 11, further comprising:
restoring a switching state of said radio frequency signal switch.

18. Method according to claim 11,
wherein said RFID technology based communications circuitry of said smart memory module is operable as a RFID transponder module and/or RFID reader module; and/or
wherein said RFID technology based communications circuitry of said terminal device is operable in accordance with Near Field Communication standard.

19. Method according to claim 11, wherein said smart memory module is detachably connected with said terminal device.

20. Method according to claim 11, wherein said radio frequency signal path between said antenna circuitry and said smart memory module is established in response to connecting said smart memory module to said terminal device.

21. Method according to claim 11, wherein said radio frequency signal path is selectively established in accordance with input of said user of said terminal device, said input being operable via a user interface.

22. A non-transitory machine-readable storage medium comprising program code sections for carrying out the operations of claim 11, when said program code sections are run on a processor-based device, a terminal device, a network device, a portable terminal, a consumer electronic device, or a mobile communication enabled terminal.

23. Smart memory module comprising a RFID technology based communications circuitry,
wherein said smart memory module is configured to be connectable with a smart memory module interface of a mobile terminal device,
wherein said mobile terminal comprises:
antenna circuitry, which is configured to transmit and receive data carrying radio frequency (RF) signals;
a RFID technology based communications circuitry;
a smart memory module interface, which is configured to interface with said at least one smart memory module when said smart memory module is present at said smart memory module interface, wherein said smart memory module is configured to perform at least one of a wireless payment transaction and a wireless ticketing transaction;
a radio frequency signal switch operatively connected to said antenna circuitry and configured to switch said antenna circuitry to be operatively connected with one of said RFID technology based communications circuitry of said terminal device and said RFID technology based communications circuitry of said smart memory module; and
a processor configured to generate a switching signal for controlling operation of said radio frequency signal switch, based on at least a criteria comprising whether said smart memory module is present at said smart memory module interface and reception of a switching command issued by an active application operable with the mobile terminal, to control whether said smart memory module performs said at least one of a wireless payment transaction and a wireless ticketing transaction.

24. Smart memory module according to claim 23, further comprising:
a matching circuitry configured to adjust characteristics between an antenna circuitry of a mobile terminal device and said RFID technology based communications circuitry of said smart memory module.

25. Smart memory module according to claim 23, further comprising: a protected data storage for storing confidential data.

26. Smart memory module according to claim 23, wherein said smart memory module is detachably connectable with said smart memory interface of said terminal device.

27. Smart memory module according to claim 23, wherein said smart memory module is configured to provide at least one of the following:
a radio frequency signal connector configured to transmit and/or receive radio frequency signals via said antenna of said mobile terminal device;
a presence signal to said terminal device;
a switching signal to said terminal device;
a data connector configured to exchange data and/or instructions with said mobile terminal device; and
a power connector for receiving a supply voltage.

28. System comprising a mobile terminal device and at least one smart memory module;
wherein said smart memory module comprises RFID technology based communications circuitry;
wherein said mobile terminal comprises:
antenna circuitry, which is configured to transmit and receive data carrying radio frequency (RF) signals;
a RFID technology based communications circuitry;
a smart memory module interface, which is configured to interface with said at least one smart memory module when said smart memory module is present at said smart memory module interface, wherein said smart memory module is configured to perform at least one of a wireless payment transaction and a wireless ticketing transaction;
a radio frequency signal switch operatively connected to said antenna circuitry and configured to switch said antenna circuitry to be operatively connected with one of said RFID technology based communications circuitry of said terminal device and said RFID technology based communications circuitry of said smart memory module; and a processor configured to generate a switching signal for controlling operation of said radio frequency signal switch, based on at least a criteria comprising whether said smart memory module is present at said smart memory module interface and reception of a switching command issued by an active application operable with the mobile terminal, to control whether said smart memory module performs said at least one of a wireless payment transaction and a wireless ticketing transaction.

29. Module for controlling a mobile terminal device, wherein said mobile terminal comprises:

antenna circuitry, which is configured to transmit and receive data carrying radio frequency (RF) signals;

a RFID technology based communications circuitry;

a smart memory module interface, which is configured to interface with said at least one smart memory module when said smart memory module is present at said smart memory module interface, wherein said smart memory module is configured to perform at least one of a wireless payment transaction and a wireless ticketing transaction; and a radio frequency signal switch operatively connected to said antenna circuitry and configured to switch said antenna circuitry to be operatively connected with one of said RFID technology based communications circuitry of said terminal device and said RFID technology based communications circuitry of said smart memory module;

wherein said module for controlling comprises:

a processing unit configured to generate a switching signal for controlling operation of said radio frequency signal switch, based on at least a criteria comprising whether said smart memory module is present at said smart memory module interface and reception of a switching command issued by an active application operable with the mobile terminal device, to control whether said smart memory module performs said at least one of a wireless payment transaction and a wireless ticketing transaction.

\* \* \* \* \*